United States Patent
Sudo et al.

(10) Patent No.: US 9,210,502 B2
(45) Date of Patent: Dec. 8, 2015

(54) ECHO CANCELLING DEVICE

(75) Inventors: Takashi Sudo, Tokyo (JP); Atsuyoshi Yano, Tokyo (JP); Tomoharu Awano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 46 days.

(21) Appl. No.: 14/361,835

(22) PCT Filed: Apr. 25, 2012

(86) PCT No.: PCT/JP2012/002838
§ 371 (c)(1),
(2), (4) Date: May 30, 2014

(87) PCT Pub. No.: WO2013/160945
PCT Pub. Date: Oct. 31, 2013

(65) Prior Publication Data
US 2014/0286498 A1  Sep. 25, 2014

(51) Int. Cl.
*H04B 3/20* (2006.01)
*H04R 3/00* (2006.01)
*H04M 9/08* (2006.01)

(52) U.S. Cl.
CPC .............. *H04R 3/002* (2013.01); *H04M 9/082* (2013.01)

(58) Field of Classification Search
CPC ............ H04R 3/002; H04B 3/20; H04B 3/21; H04B 3/23; H04M 3/00; H04M 3/002; H04M 9/082
USPC ........................ 381/66, 98, 71.14, 94.1–94.3; 370/286–292, 295; 379/406.01–406.16
See application file for complete search history.

(56) References Cited

U.S. PATENT DOCUMENTS

| | | | |
|---|---|---|---|
| 5,774,561 | A | 6/1998 | Nakagawa et al. |
| 5,828,756 | A | 10/1998 | Benesty et al. |
| 6,628,781 | B1 | 9/2003 | Grundström et al. |
| 2010/0166213 | A1 | 7/2010 | Okumura et al. |
| 2011/0135105 | A1 | 6/2011 | Yano |

FOREIGN PATENT DOCUMENTS

| | | |
|---|---|---|
| CN | 1367977 A | 9/2002 |
| CN | 1223166 C | 10/2005 |
| DE | 696 34 027 T2 | 12/2005 |
| JP | 9 116472 | 5/1997 |

(Continued)

OTHER PUBLICATIONS

Office Action issued Feb. 15, 2015 in Chinese Patent Application No. 201280067060.4 (with English language translation).

(Continued)

*Primary Examiner* — Paul S Kim
*Assistant Examiner* — Sabrina Diaz
(74) *Attorney, Agent, or Firm* — Oblon, McClelland, Maier & Neustadt, L.L.P.

(57) ABSTRACT

An echo cancelling device splits a low-band signal through LPFs having characteristics which do not cause aliasing during downsampling of downsamplers, and splits a high-band signal through HPFs having characteristics which do not cause aliasing during downsampling of downsamplers. The echo canceling device generates a mid-band signal by subtracting the low-band signal and the high-band signal from a pre-split signal by adder-subtractors, and cancels an echo on a band-by-band basis.

4 Claims, 5 Drawing Sheets

(56) References Cited

FOREIGN PATENT DOCUMENTS

| JP | 10 190848 | 7/1998 |
| JP | 2006 203358 | 8/2006 |
| JP | 2010 154356 | 7/2010 |
| WO | WO 00/76081 A2 | 12/2000 |
| WO | WO 2009/070073 A1 | 6/2009 |

OTHER PUBLICATIONS

Jairaj, C.M., et al., "QMF Implementation using Xilinx SysGen (XSG)", $3^{rd}$ IEEE ICCSIT, vol. 4, pp. 142-145, (Jul. 9, 2010).
Fukui, M., et al., "20-kHz Frequency-Range Acoustic Echo Canceller for High-Quality TV Conferencing", IEEE, Total 2 Pages, (Jan. 10, 2009).
Nongpiur, R.C., et al., "Maximizing the Signal/Alias Ratio in Non-Uniform Filter Banks for Acoustic Echo Cancellation", IEEE, pp. 402-405, (Jun. 26, 2011).
International Search Report Issued May 29, 2012 in PCT/JP12/002838 Filed Apr. 25, 2012.
Office Action issued Mar. 20, 2015 in German Patent Application No. 11 2012 006 266.3 (with English language translation).

(a)

(b)

ECHO CANCELLING DEVICE

TECHNICAL FIELD

The present invention relates to an echo cancelling device that cancels an echo signal superimposed on an acoustic signal.

BACKGROUND ART

Systems in which an output by a speaker enters a microphone, such as a hands-free calling system and a telephone conference system, need to ensure their call quality, particularly to cancel echoes caused by acoustic coupling occurring on a two-way call. For a technique of cancelling the echoes, there is an acoustic echo canceller that has an adaptive filter which identifies a transfer function between a speaker and a microphone, generates a pseudo echo signal using an echo path identified by the adaptive filter, subtracts the pseudo echo signal from an input signal of the microphone, and thereby cancels an echo transmitted from the speaker to the microphone. A conventional acoustic echo canceller cancels echoes by means of a single adaptive filter. However, since an acoustic signal has an unbalanced energy distribution in a frequency band, there is a drawback that sufficient echo suppression cannot be performed with the single adaptive filter due to a convergence delay, etc.

As an acoustic echo canceller that solves such a drawback, there is a sub-band echo canceller which splits an acoustic signal into a plurality of frequency bands and performs echo cancellation on an individual band basis. In the sub-band echo canceller, since learning by an adaptive filter is performed on a narrow bandwidth basis, elimination of the influence of an unbalanced energy distribution can be expected. In addition, since the sampling frequency can be reduced by splitting the band, a reduction in the amount of computation can be expected. More specifically, assuming that the band (0 to 4 kHz) of a signal having a sampling frequency of 8 kHz is split into two sub-bands of 0-2 kHz and 2-4 kHz, a bandwidth of each sub-band is 2 kHz. Since the signal of each sub-band can be represented as a signal with a sampling frequency of 4 kHz, the sampling frequency can be reduced to half.

However, there is a problem, due to the influence of aliasing during downsampling, that the echo existing near a boundary between the split bands is not sufficiently eliminated, causing a residual echo. FIG. 5 shows an illustrative diagram depicting the aliasing caused by downsampling. When a signal with a sampling frequency of 16 kHz is downsampled to convert the sampling frequency to 8 kHz, if there is a signal component in a frequency band higher than one-half of the sampling frequency, then a folding signal, i.e., aliasing, is generated.

In Patent Literature 1, after separating an input signal of a microphone into a high-band component and a low-band component through a quadrature mirror filter (QMF), a thinning process on each separated component is performed for downsampling. Therefore, echo canceller for each band can be achieved with a small amount of computation. In addition, by providing a high pass filter (HPF), which allows only high-frequency components to pass therethrough, for the low-band component of the input signal, an echo signal existing near the band boundary can be eliminated.

CITATION LIST

Patent Literature 1: JP 2006-203358 A

SUMMARY OF INVENTION

In the above-described Patent Literature 1, an HPF process is performed on an input signal for the purpose of echo elimination near the band boundary. However, this may cause a loss of a low-band component of the input signal itself, and may raise a problem of deterioration in sound quality.

The present invention is made to solve a problem such as that described above, and an object of the invention is to cancel echoes without impairing sound quality by eliminating the influence of aliasing caused by band splitting.

In an echo cancelling device of the invention, a primary band splitter includes: a low-pass filter that generates a low-band primary split signal by splitting a low-band component of the signal to be split, the low-pass filter having a filter characteristic which does not cause aliasing during downsampling; a low-band side downsampler that downsamples the low-band primary split signal split by the low-pass filter; a high-pass filter that generates a high-band primary split signal by splitting a high-band component of the signal to be split, the high-pass filter having a filter characteristic which does not cause aliasing during downsampling; a high-band side downsampler that downsamples the high-band primary split signal split by the high-pass filter; and an adder-subtractor that generates a mid-band primary split signal by subtracting, from the signal to be split, the low-band primary split signal output by the low-band side downsampler and the high-band primary split signal output by the high-band side downsampler.

According to the present invention, an original signal is split into a low-band signal and a high-band signal through a low-pass filter and a high-pass filter each of which has a characteristic that does not cause aliasing during downsampling, and the low-band signal and the high-band signal are subtracted from the original signal, thereby generating a mid-band signal. By this, the influence of aliasing caused by downsampling performed on band splitting can be eliminated, and thus, echoes can be cancelled without impairing sound quality.

DESCRIPTION OF EMBODIMENT

In order to more specifically describe the invention, embodiments for implementing the invention will be described below with reference to the accompanying drawings.

Embodiment 1

Figure 1:
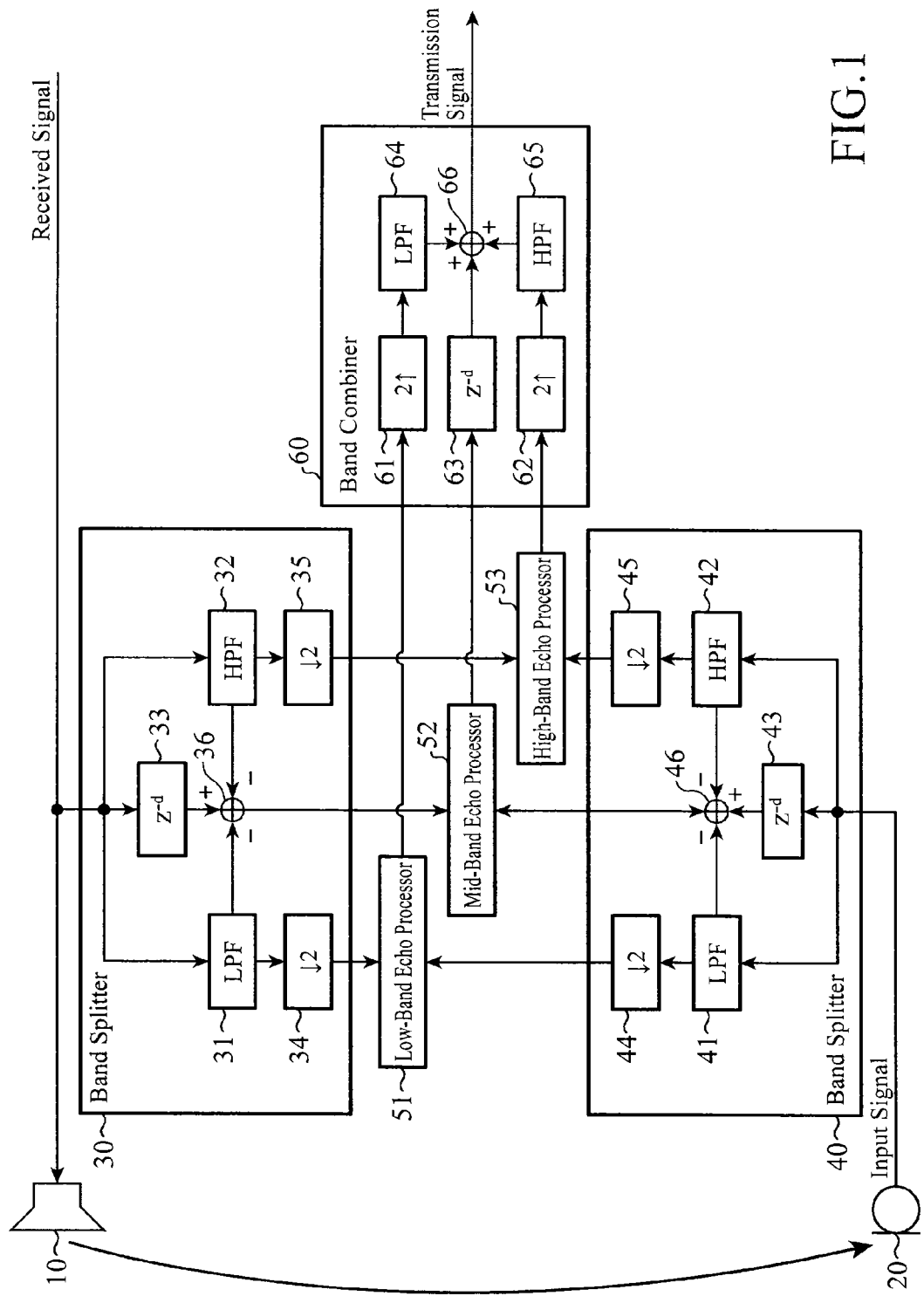
FIG. 1 is a block diagram depicting a configuration of an echo cancelling device according to Embodiment 1 of the present invention.

An echo cancelling device shown in FIG. 1 is applied to, for example, a hands-free calling system. The echo cancelling device outputs to a speaker 10 an audio signal from a call destination which is received by a communication device of the system, and picks up surrounding sound through a microphone 20, and then transmits the sound to the call destination from the communication device. In order to cancel an echo superimposed on an input signal (an audio signal) of the microphone 20 by using a received signal as a reference signal to be output to the speaker 10, the echo cancelling device has band splitters (as "primary band splitters") 30 and 40, a low-band echo processor 51, a mid-band echo processor 52, a high-band echo processor 53, and a band combiner 60.

The band splitter 30 is composed of a low pass filter (LPF) 31, an HPF 32, a delay unit 33, a downsampler (as "low-band side downsampler") 34, a downsampler (as "high-band side downsampler") 35, and an adder-subtractor 36. The band splitter 30 receives a received signal, extracts a low-band component by the LPF 31, and performs a downsampling process on the low-band component by the downsampler 34 and thereby generates a downsampled low-band signal (as "low-band primary split signal"). In addition, a high-band component is extracted from the received signal by the HPF 32, and a downsampling process is performed on the high-band component by the downsampler 35, thereby generating a downsampled high-band signal (as "high-band primary split signal"). Furthermore, after delaying the received signal by the delay unit 33, the low-band component output by the LPF 31 and the high-band component output by the HPF 32 are subtracted by the adder-subtractor 36 from the delayed received signal, thereby generating a mid-band signal (as "mid-band primary split signal").

As with the band splitter 30, the band splitter 40 is composed of an LPF 41, an HPF 42, a delay unit 43, downsamplers 44 and 45, and an adder-subtractor 46. The band splitter 40 receives an input signal of the microphone 20, extracts a low-band component by the LPF 41, and performs a downsampling process on the low-band component by the downsampler 44 and thereby generates a downsampled low-band signal. In addition, a high-band component is extracted from the input signal by the HPF 42, and a downsampling process on the high-band component is performed by the downsampler 45, thereby generating a downsampled high-band signal. Furthermore, after delaying the input signal by the delay unit 43, the low-band component output by the LPF 41 and the high-band component output by the HPF 42 are subtracted by the adder-subtractor 46 from the delayed input signal, thereby generating a mid-band signal.

The low-band echo processor 51 receives the low-band signals generated by the band splitter 30 and the band splitter 40, and performs an echo cancellation process. The mid-band echo processor 52 receives the mid-band signals generated by the band splitter 30 and the band splitter 40, and performs an echo cancellation process. The high-band echo processor 53 receives the high-band signals generated by the band splitter 30 and the band splitter 40, and performs an echo suppression process.

In this embodiment, the low-band echo processor 51 and the high-band echo processor 53 respectively performs an echo cancellation process using an adaptive filter, and uses, for example, a normalized least mean squares filter (NLMS) as the adaptive filter. The low-band echo processor 51 performs an adaptive process using the low-band signal of the input side which is obtained by the band splitter 40 and also using, as a reference signal, the low-band signal of the receiving side which is obtained by the band splitter 30, thereby estimating an echo component. A signal obtained by subtracting the estimated echo component from the low-band signal of the input side is identified as an output signal from the low-band echo processor 51.

Likewise, the high-band echo processor 53 performs an adaptive process using the high-band signal of the input side which is obtained by the band splitter 40 and also using, as a reference signal, the high-band signal of the receiving side which is obtained by the band splitter 30, thereby estimating an echo component. A signal obtained by subtracting the estimated echo component from the high-band signal of the input side is identified as an output signal from the high-band echo processor 53.

Note that although the NLMS is used as the adaptive filter, other adaptive filters such as a least mean squares filter (LMS), a recursive least squares filter (RLS), or an affine projection filter can be used, alternatively.

Since a bandwidth applied to the mid-band echo processor 52 is narrow, this mid-band echo processor 52 achieves a reduction in echo by a time-domain echo suppression process instead of by an echo cancellation through an adaptive filter. In the Embodiment 1, the mid-band echo processor 52 uses, as a reference signal, the mid-band signal of the receiving side which is obtained by the band splitter 30, and determines the amount of echo suppression on a basis of power information of the mid-band signal of the input side which is obtained by the band splitter 40.

The band combiner 60 is composed of upsamplers 61 and 62, a delay unit 63, an LPF 64, an HPF 65, and an adder 66. The band combiner 60 receives the output signal from the low-band echo processor 51, and performs an upsampling process by the upsampler 61 and removes by the LPF 64 a folding component generated in the upsampling process, thereby generating a low-band signal. In addition, the band combiner 60 receives the output signal from the high-band echo processor 53, and performs an upsampling process by the upsampler 62 and removes by the HPF 65 a folding component generated in the upsampling process, thereby generating a high-band signal. Furthermore, the mid-band signal output by the mid-band echo processor 52 is delayed by the delay unit 63, and the delayed mid-band signal, the low-band signal output by the LPF 64, and the high-band signal output by the HPF 65 are added together by the adder 66, thereby generating a transmission signal.

Next, operation will be described.

The band splitter 30 receives a received signal, and, after generating a low-band signal and a high-band signal, generates a mid-band signal by subtracting the low-band signal and the high-band signal from the whole receive signal.

Figure 2:
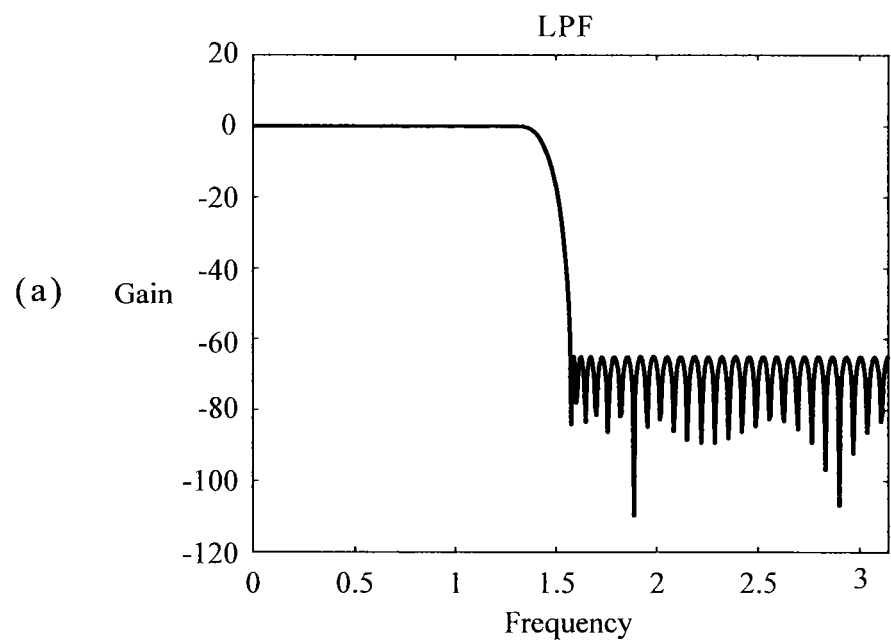
FIGS. 2(a) and 2(b) are graphs representing characteristics of a low-pass filter and a high-pass filter, which are used by the echo cancelling device according to the Embodiment 1.
Figure 2:
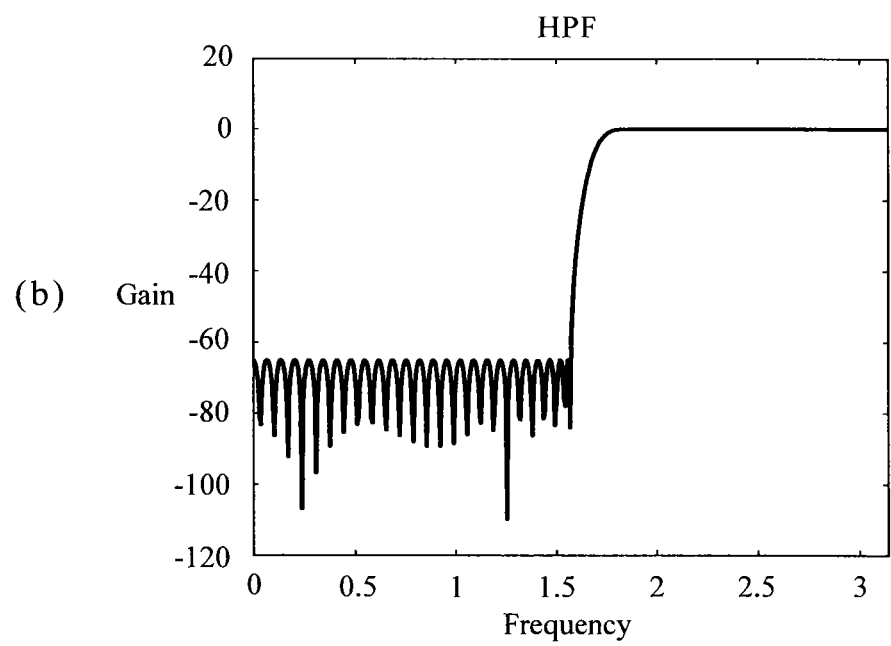
Figure 3:
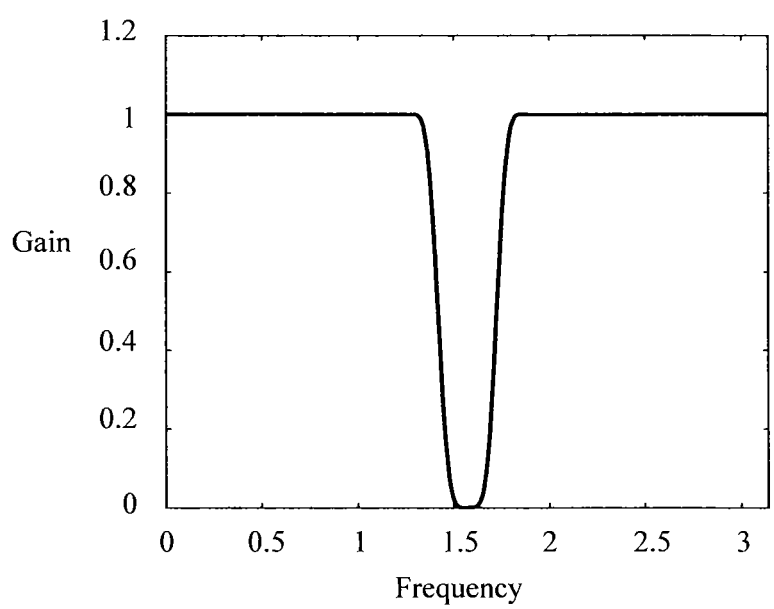
FIG. 3 is a graph representing a frequency characteristic of a signal obtained by combining output signals from the low-pass filter and the high-pass filter depicted in FIGS. 2(a) and 2(b).

FIG. 2(*a*) represents an example of a characteristic of the LPF 31 that generates a low-band signal, and FIG. 2(*b*) represents an example of a characteristic of the HPF 32 that generates a high-band signal. FIG. 3 represents a frequency characteristic of a signal obtained by combining the output signals from the LPF 31 and the HPF 32. In the case of splitting the band of the received signal into two sub-bands, the cut-off frequency of the LPF 31 is set to be equal to or less than a center frequency of the band of the received signal, and the cut-off frequency of the HPF 32 is set to be equal to or more than the center frequency. By using filters having such characteristics, even if downsampling processes by the downsamplers 34 and 35 are performed, aliasing does not occur in the output signals. Therefore, there is no influence of aliasing on a transmission signal which is obtained by combining, by the band combiner 60, output results from the subsequent low-band echo processor 51 and high-band echo processor 53.

Meanwhile, by generating the low-band signal and the high-band signal with the filter characteristics of FIGS. 2(a) and 2(b), and combining these signals, as shown in FIG. 3, a signal near a boundary band of 1.5 kHz, which is set as the cut-off frequencies of the LPF 31 and the HPF 32, drops out. In order not to allow the signal near the boundary band to drop out, a mid-band signal is generated. A method of generating a mid-band signal is as follows.

First, the delay unit 33 delays a received signal by the same amount as delays occurring in the LPF 31 and the HPF 32. Thereafter, the adder-subtractor 36 subtracts output signals of the LPF 31 and the HPF 32 from the output signal of the delay unit 33, and calculates a mid-band signal near a boundary band.

The band splitter 40 is designed to operate in the same manner as the band splitter 30, except that a signal used for input is not a received signal, but is an input signal of the microphone 20. That is, the filter characteristics of the LPF 41 and the HPF 42 are the same as those of the LPF 31 and the HPF 32, respectively.

As described above, in the Embodiment 1, the echo cancelling device includes the band splitter 30 and the band splitter 40. The band splitter 30 is composed of: the LPF 31 that generates a low-band signal by splitting a low band component of a received signal and has a filter characteristic which does not cause aliasing during downsampling; the downsampler 34 that downsamples the low-band signal split by the LPF 31; the HPF 32 that generates a high-band signal by splitting a high-band component of the received signal and has a filter characteristic which does not cause aliasing during downsampling; the downsampler 35 that downsamples the high-band signal split by the HPF 32; and the adder-subtractor 36 that generates a mid-band signal by subtracting, from the received signal delayed by the delay unit 33, the low-band signal output by the downsampler 34 and the high-band signal output by the downsampler 35. The band splitter 40 is used for an input signal of the microphone 20 and has the same configuration as the band splitter 30 mentioned above. Therefore, an echo cancellation process can be performed without influenced by aliasing during downsampling performed on band splitting. In addition, since there is no need to perform an HPF process on a low-band signal, unlike a conventional sub-band echo canceller such as that shown in the above-described Patent Literature 1, low-band distortion does not occur in an input signal, providing the effect of being able to maintain sound quality.

In addition, according to the Embodiment 1, the echo cancelling device is configured such that the low-band echo processor 51 and the high-band echo processor 53 perform an echo cancellation process on a low-band signal and a high-band signal by using an adaptive filter, and the mid-band echo processor 52 performs an echo suppression process on a mid-band signal. Therefore, the amount of computation for echo processing on the mid-band signal, which has not yet been subjected to a downsampling process, can be suppressed.

In the above-described Embodiment 1, the filter characteristics of the LPFs 31 and 41 and the HPFs 32 and 42 have the characteristics shown in FIGS. 2(a) and 2(b) on performing band splitting. Alternatively, as long as filters have characteristics that do not cause aliasing during downsampling, any other filters than those having the characteristics shown in FIGS. 2(a) and 2(b) can be applied.

Although only the mid-band echo processor 52 performs an echo suppression process, the mid-band echo processor 52 may alternatively perform an echo cancellation process using an adaptive filter. Furthermore, although echo processing is performed on a mid-band signal without downsampling thereon, the mid-band echo processing may be performed after performing downsampling such that the sampling frequency becomes, for example, ⅔ instead of ½. In this case, there is a trade-off between the amount of reduction in computation for the echo processing which is brought about by the reduction in sampling frequency, and the amount of increase in computation for the downsampling process.

Embodiment 2

Although the above-described Embodiment 1 is configured to split a band into three sub-bands, the low-band, the mid-band, and the high-band, it is also possible to subdivide the band into narrower bands. Embodiment 2 describes an example of subdividing a band of a low-band signal.

Figure 4:
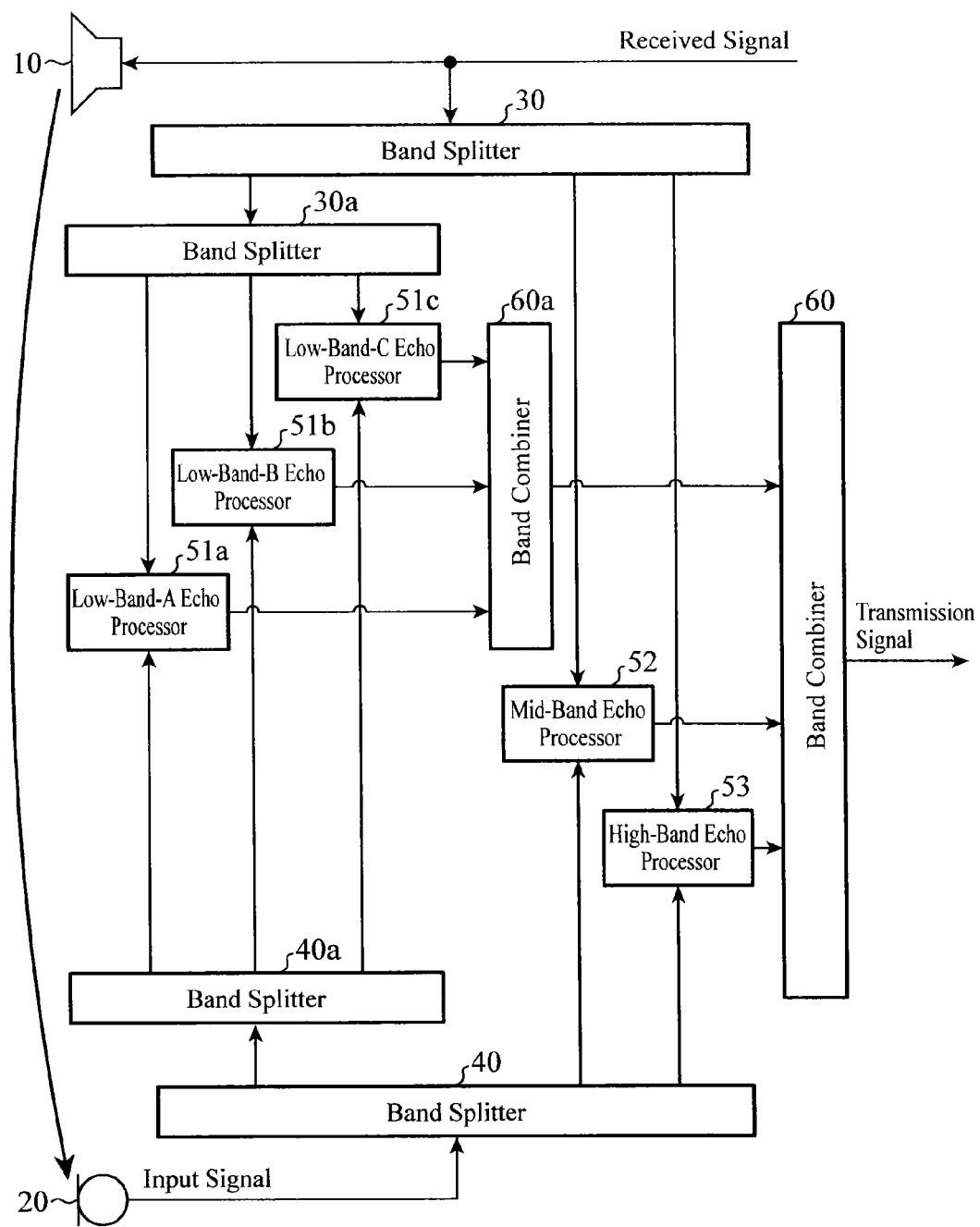
FIG. 4 is a block diagram depicting a configuration of an echo cancelling device according to Embodiment 2 of the present invention.
Figure 5:
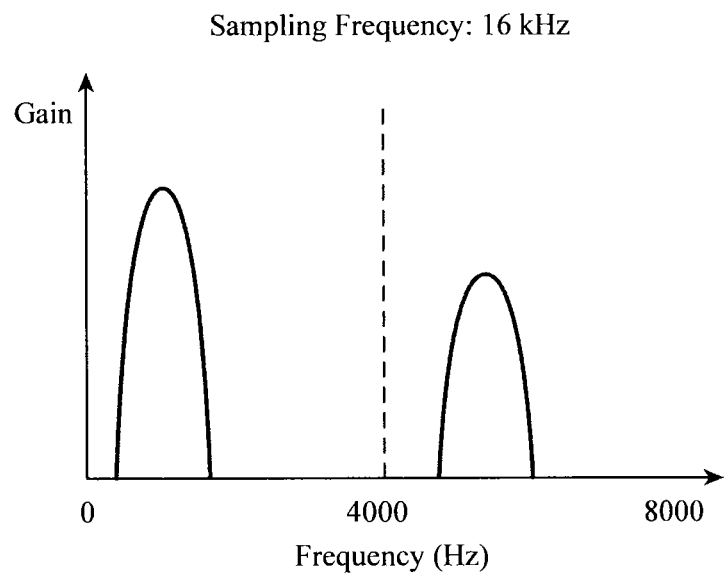
FIG. 5 is a graph representing aliasing caused by downsampling in a conventional sub-band echo canceller.
Figure 5:
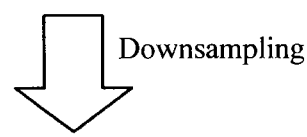
Figure 5:
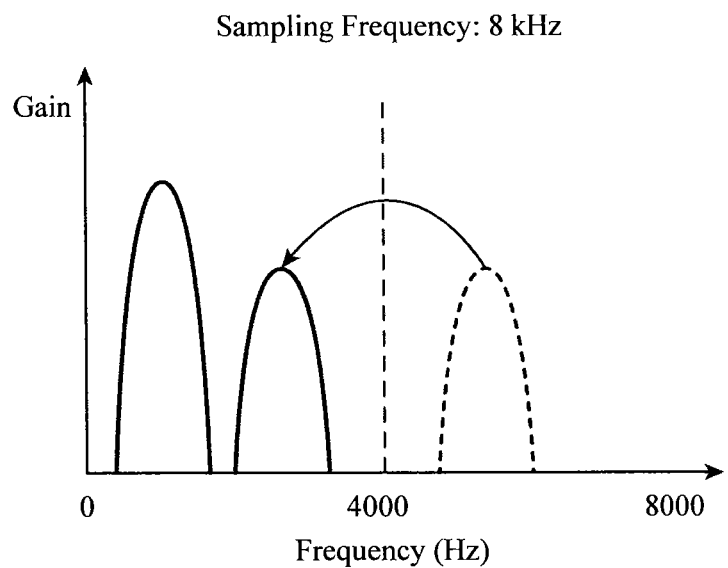

FIG. 4 is a block diagram depicting a configuration of an echo cancelling device according to the Embodiment 2. In FIG. 4, the same or corresponding portions to those in FIG. 1 are denoted by the same reference signs. In the Embodiment 2, band splitters 30 and 40 are used as primary band splitters that respectively perform primary-splitting on a received signal and an input signal to split into individual primary split signals with respect to low-band, mid-band, and high-band. On the other hand, band splitters 30a and 40a are used as secondary band splitters. These band splitters 30a and 40a respectively perform secondary-splitting on the low-band primary split signals, whose bands have been split by the primary band splitters, and thereby generate individual secondary split signals with respect to low-band (referred to as "low-band-A"), mid-band (referred to as "low-band-B"), and high-band (referred to as "low-band-C").

In FIG. 4, the band splitter 30 receives a received signal and splits the band into three sub-bands, namely, a low-band, a mid-band, and a high-band. The band splitter 40 receives an input signal of a microphone 20 and splits the band into three sub-bands, namely, a low-band, a mid-band, and a high-band. In the above-described Embodiment 1, the low-band signals obtained by the band splitter 30 and the band splitter 40 are subjected to the echo cancellation process in a low-band echo processor 51. The Embodiment 2 is different from the Embodiment 1 in that, the low-band signals are subdivided by the band splitter 30a and the band splitter 40a into three sub-bands, namely, the low-band-A, the low-band-B, and the low-band-C.

The band splitter 30a has the same internal configuration as the band splitter 30 shown in FIG. 1. The band splitter 30a extracts a low-band-A component by an LPF from the low-band signal generated by the band splitter 30, and performs a downsampling process on the low-band-A component by a downsampler to generate a low-band-A signal. A low-band-C component is extracted by an HPF from the low-band signal, and a downsampling process is performed on the low-band-C component by a downsampler, thereby generating a low-band-C signal. Furthermore, after delaying the low-band signal by a delay unit, the low-band-A component and the low-band-C component are subtracted by an adder-subtractor from the delayed low-band signal, thereby generating a low-band-B signal.

The band splitter 40a performs the same operation as the band splitter 30a, except that a signal used for input is not a low-band signal of the receiving side, but is a low-band signal of the input side of the microphone 20, and generates a low-band-A signal, a low-band-B signal, and a low-band-C signal.

Note that the filter characteristics of the LPFs and the HPFs extracting low-band-A components and low-band-C components in the band splitters 30a and 40a are those that do not cause aliasing during downsampling, such as the filter characteristics shown in FIGS. 2(a) and 2(b), for example.

A low-band-A echo processor 51a receives the low-band-A signals generated by the band splitter 30a and the band splitter 40a, and performs an echo cancellation process. A low-band-B echo processor 51b receives the low-band-B signals generated by the band splitter 30a and the band splitter 40a, and performs an echo cancellation process. A low-band-C echo processor 51c receives the low-band-C signals generated by the band splitter 30a and the band splitter 40a, and performs an echo cancellation process.

As described in the Embodiment 1, while the low-band-A echo processor 51 a and the low-band-C echo processor 51c perform an echo cancellation process using an adaptive filter, the low-band-B echo processor 51b performs an echo cancellation process using an adaptive filter or alternatively performs an echo suppression process without using the adaptive filter.

A band combiner 60a has the same internal configuration as a band combiner 60 shown in FIG. 1. The band combiner 60a receives an output signal from the low-band-A echo processor 51 a, performs an upsampling process by an upsampler and removes a folding component by an LPF and thereby generates a low-band-A signal. In addition, the band combiner 60a receives an output signal from the low-band-C echo processor 51c, performs an upsampling process by an upsampler, and removes a folding component by an HPF to generate a low-band-C signal. Furthermore, an output signal from the low-band-B echo processor 51b is delayed by a delay unit, and the delayed low-band-B signal, the low-band-A signal having passed through the LPF, and the low-band-C signal having passed through the HPF are added together by an adder, thereby generating a low-band signal. The generated low-band signal is output to a band combiner 60.

The band combiner 60 adds the low-band signal obtained by the band combiner 60a to a mid-band signal obtained by a mid-band echo processor 52 and a high-band signal obtained by a high-band echo processor 53, and thereby generates a transmission signal.

According to the above-described Embodiment 2, the echo cancelling device is configured to have the band splitters 30a and 40a that subdivide the low-band signals, having been split by the band splitters 30 and 40, into a plurality of sub-bands, and thereby output individual signals of low-band-A to low-band-C. Therefore, an echo cancellation process can be performed without influenced by aliasing, and furthermore, the amount of computation for an echo cancellation process for low-band signals can be further reduced compared to the above-described Embodiment 1.

In the Embodiment 2, the same filter characteristics are used for LPFs 31 and 41 and HPFs 32 and 42, which are used in the band splitter 30 and the band splitter 40, and LPFs and HPFs, which are used in the band splitter 30a and the band splitter 40a. Alternatively, the filter characteristics may differ between, for example, the band splitters 30 and 40 and the band splitters 30a and 40a.

In the Embodiment 2, the band splitters 30a and 40a are added to respectively subdivide the low-band signals into three signals. Alternatively, a band splitter may be added for one or both of a mid-band signal and a high-band signal in order to subdivide the signal into three signals.

The Embodiment 1 exemplary describes a band splitting of three sub-bands, and the Embodiment 2 exemplary describes a band splitting of five sub-bands. However, the configuration is not limited thereto, and the optional number of splits may be applied.

For example, in the case of bisection, the filter lengths of the LPF 31 and the HPF 32 are increased to make their characteristics steep (i.e., to make a pass-band and a cut-off band identical), by which a mid-band can be prevented from being generated.

In addition, for another example, in the case of quartering, the low-band signal among three split signals of high-band, mid-band, and low-band signals, is subdivided into two signals, by which band splitting into four sub-bands in total is possible. Note that when subdividing the low-band signal into two signals, there is a need to use filters having characteristics which do not allow a mid-band to be generated, as described above.

Note that in the invention of the present application, free combinations of the embodiments, or modifications of any component in the embodiments, or omissions of any component in the embodiments may be made within the scope of the present invention.

As described above, the echo cancelling devices according to the present invention perform an echo cancellation process without influenced by aliasing, and thus are suitable to be used in systems in which an output by a speaker enters a microphone, such as a hands-free calling system and a telephone conference system.

The invention claimed is:

1. An echo cancelling device comprising:
   a primary band splitter that splits each of a reference signal and an audio signal into a plurality of bands and outputs a plurality of primary split signals with respect to each of the reference signal and the audio signal;
   an echo processor that performs, for each of the bands, an echo cancellation process on each primary split signal of the audio signal by referring to a corresponding primary split signal of the reference signal; and
   a band combiner that combines the primary split signals of the audio signal on which the echo cancellation process on a band-by-band basis has been performed by the echo processor,
   wherein the primary band splitter has:
   a low-pass filter that generates a low-band primary split signal by splitting a low-band component of the signal to be split, the low-pass filter having a filter characteristic which does not cause aliasing during downsampling;
   a low-band side downsampler that downsamples the low-band primary split signal split by the low-pass filter;
   a high-pass filter that generates a high-band primary split signal by splitting a high-band component of the signal to be split, the high-pass filter having a filter characteristic which does not cause aliasing during downsampling;
   a high-band side downsampler that downsamples the high-band primary split signal split by the high-pass filter; and
   an adder-subtractor that generates a mid-band primary split signal by subtracting, from the signal to be split, the low-band primary split signal output by the low-band side downsampler and the high-band primary split signal output by the high-band side downsampler.

2. The echo cancelling device according to claim 1, further comprising a secondary band splitter that subdivides a primary split signal, which is included in at least one of the plurality of bands having been split by the primary band splitter, into a plurality of bands and outputs a plurality of secondary split signals,
   wherein the secondary band splitter has:
   a low-pass filter that generates a low-band secondary split signal by subdividing a low-band component of the primary split signal of the band to be subdivided, the low-pass filter having a filter characteristic which does not cause aliasing during downsampling;

a low-band side downsampler that downsamples the low-band secondary split signal split by the low-pass filter;

a high-pass filter that generates a high-band secondary split signal by subdividing a high-band component of the primary split signal of the band to be subdivided, the high-pass filter having a filter characteristic which does not cause aliasing during downsampling;

a high-band side downsampler that downsamples the high-band secondary split signal split by the high-pass filter; and an adder-subtractor that generates a mid-band secondary split signal by subtracting, from the primary split signal of the band to be subdivided, the low-band secondary split signal output by the low-band side downsampler and the high-band secondary split signal output by the high-band side downsampler.

3. The echo cancelling device according to claim 1, wherein the echo processor performs an echo cancellation process on the low-band primary split signal and the high-band primary split signal by using an adaptive filter and performs an echo suppression process on the mid-band primary split signal instead of an echo cancellation process using an adaptive filter.

4. The echo cancelling device according to claim 2, wherein the echo processor performs, for each of the bands, an echo cancellation process on a corresponding secondary split signal of the audio signal by referring to a corresponding secondary split signal of the reference signal, performs an echo cancellation process on the low-band secondary split signal and the high-band secondary split signal, using an adaptive filter, and performs an echo suppression process on the mid-band secondary split signal instead of an echo cancellation process using an adaptive filter.

* * * * *